(12) United States Patent
Naito

(10) Patent No.: US 7,938,937 B2
(45) Date of Patent: May 10, 2011

(54) SOLID-ELECTROLYTE CAPACITOR MANUFACTURING DEVICE AND MANUFACTURING METHOD

(75) Inventor: Kazumi Naito, Chiba (JP)

(73) Assignee: Showa Denko K.K., Tokyo (JP)

( * ) Notice: Subject to any disclaimer, the term of this patent is extended or adjusted under 35 U.S.C. 154(b) by 897 days.

(21) Appl. No.: 11/909,535

(22) PCT Filed: Mar. 23, 2006

(86) PCT No.: PCT/JP2006/305821
§ 371 (c)(1),
(2), (4) Date: Sep. 24, 2007

(87) PCT Pub. No.: WO2006/101167
PCT Pub. Date: Sep. 28, 2006

(65) Prior Publication Data
US 2009/0052118 A1   Feb. 26, 2009

(30) Foreign Application Priority Data

Mar. 24, 2005 (JP) ................................. 2005-086820

(51) Int. Cl.
*C25D 17/00* (2006.01)
(52) U.S. Cl. ..................... 204/198; 204/224 R
(58) Field of Classification Search .................. 204/198, 204/224 R; 205/128
See application file for complete search history.

(56) References Cited

U.S. PATENT DOCUMENTS

| | | | | |
|---|---|---|---|---|
| 3,984,255 A | * | 10/1976 | Tiegel | 205/57 |
| 4,032,414 A | * | 6/1977 | Helder et al. | 205/128 |
| 4,462,508 A | * | 7/1984 | Grafius | 221/201 |
| 4,683,417 A | * | 7/1987 | De Burgat et al. | 324/659 |

FOREIGN PATENT DOCUMENTS

| | | |
|---|---|---|
| JP | 57-37820 | 3/1982 |
| JP | 57-37820 A | 3/1982 |
| JP | 60-249310 | 12/1985 |
| JP | 60-249310 A | 12/1985 |
| JP | 62-162833 | 10/1987 |
| JP | 62-162833 U | 10/1987 |
| WO | 2005/006360 A2 | 1/2005 |

* cited by examiner

*Primary Examiner* — Luan V Van
(74) *Attorney, Agent, or Firm* — Sughrue Mion, PLLC

(57) ABSTRACT

The invention provides an apparatus for producing solid electrolytic capacitors having uniform properties with excellent ESR value efficiently at low costs and a production process using the apparatus. The production process using the apparatus is characterized in that a plurality of conductors for producing solid electrolytic capacitors are fixed to a jig for producing capacitors, the jig is transferred to above treatment baths to immerse the conductors in treatment solution in each of the baths sequentially and electric currents are passed to the conductors therein to thereby form a dielectric layer and a semiconductor layer sequentially on the conductors and that on the jig for producing capacitors, a plurality of sockets are provided for inserting and fixing ends of wires leading out of the conductors by using a robotics device.

16 Claims, 6 Drawing Sheets

[Fig. 1]
PRIOR ART
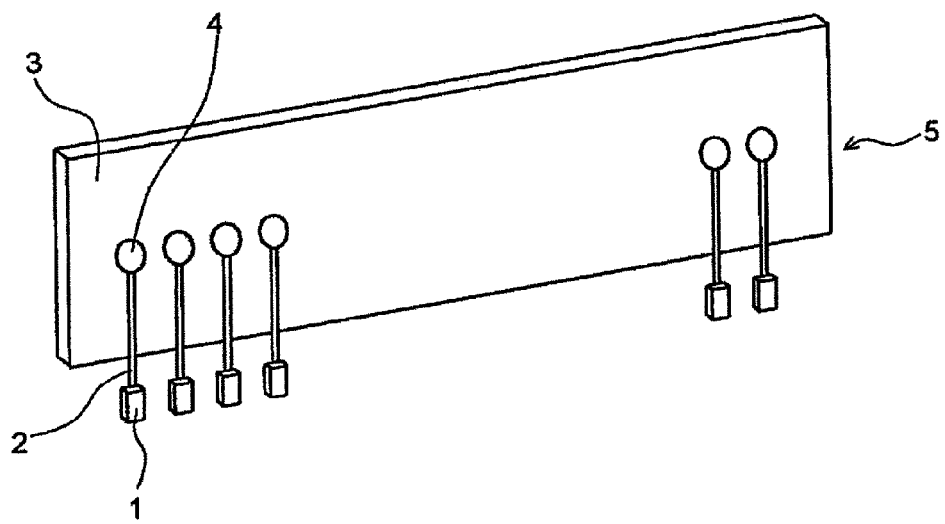

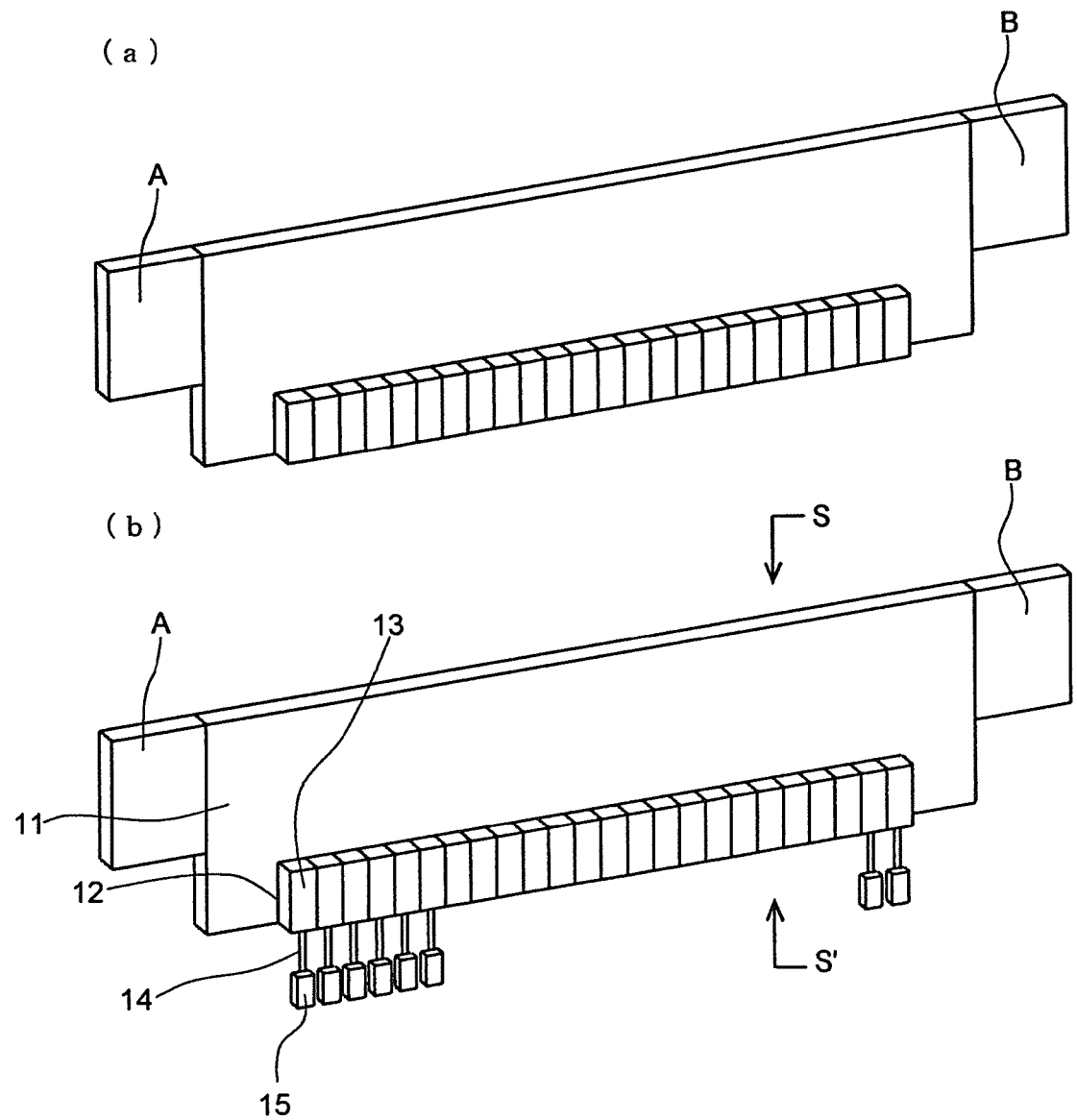
[Fig. 2]

[Fig. 3]
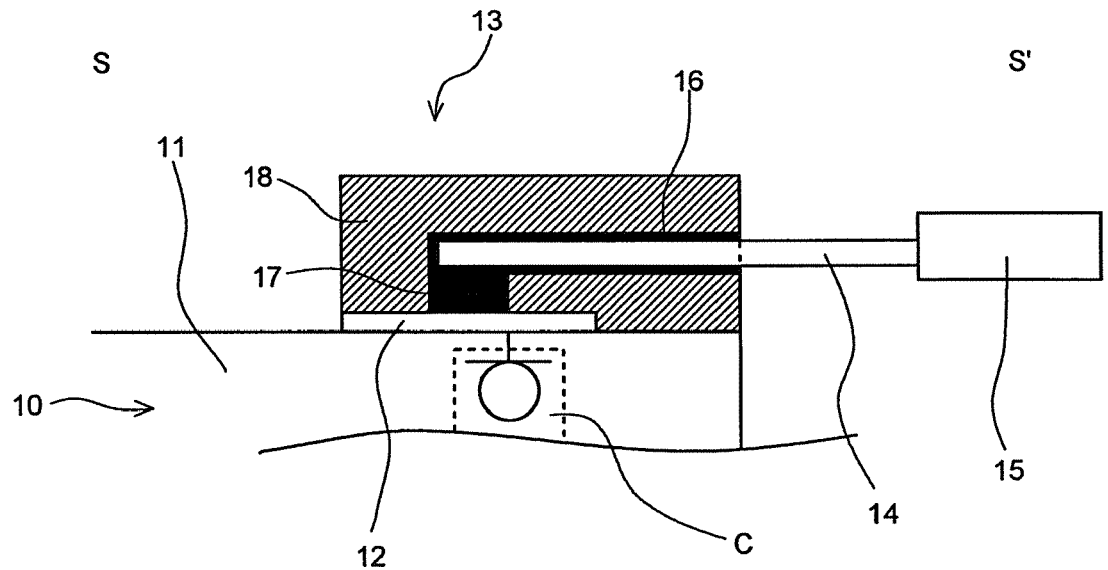
[Fig. 4]
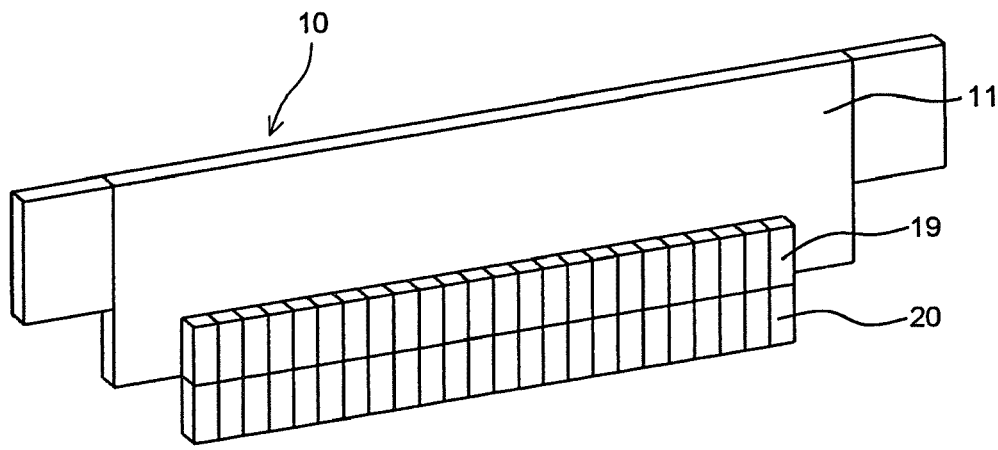
[Fig. 5]
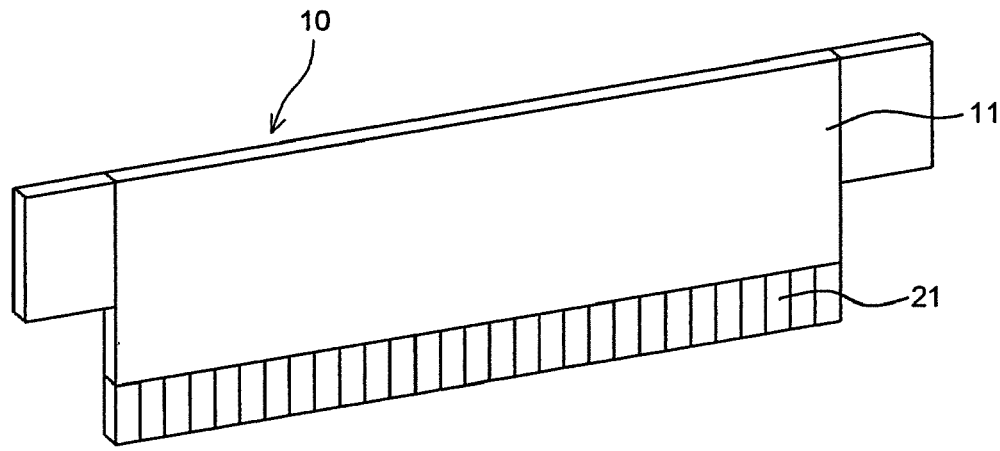

[Fig. 6]
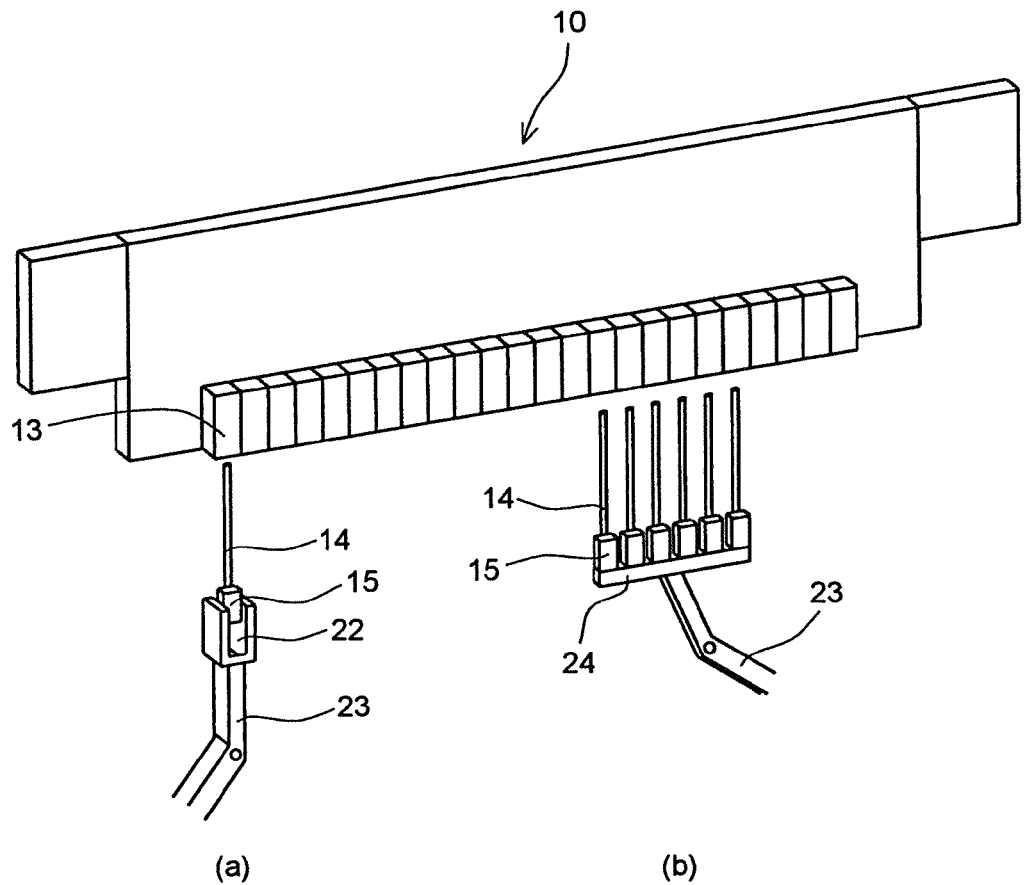
(a)  (b)
[Fig. 7]
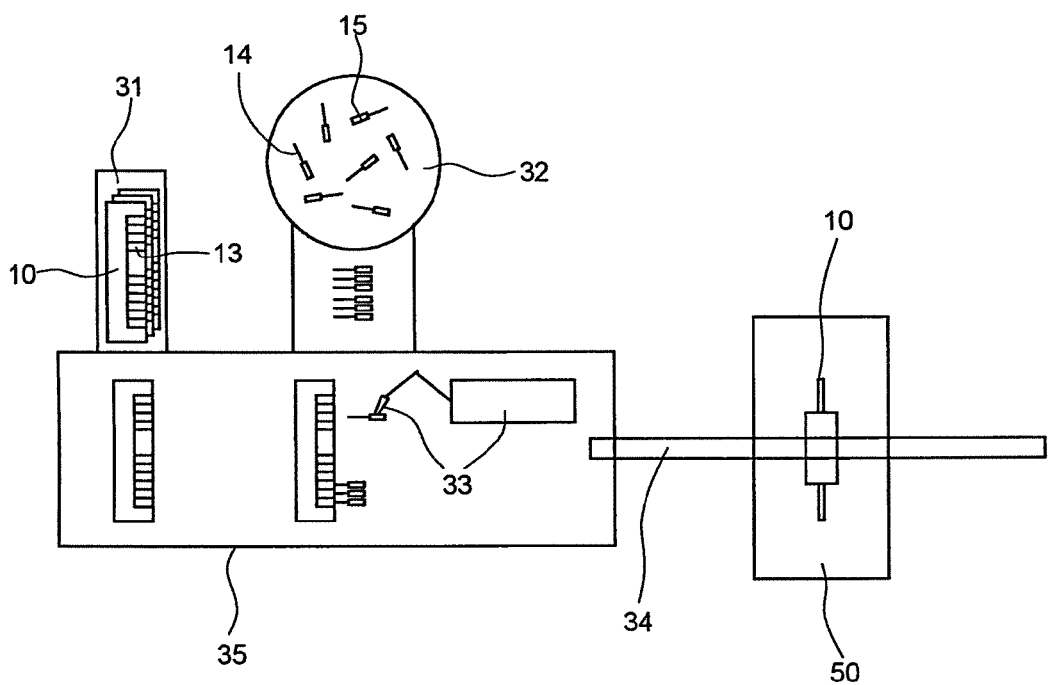

[Fig. 8]
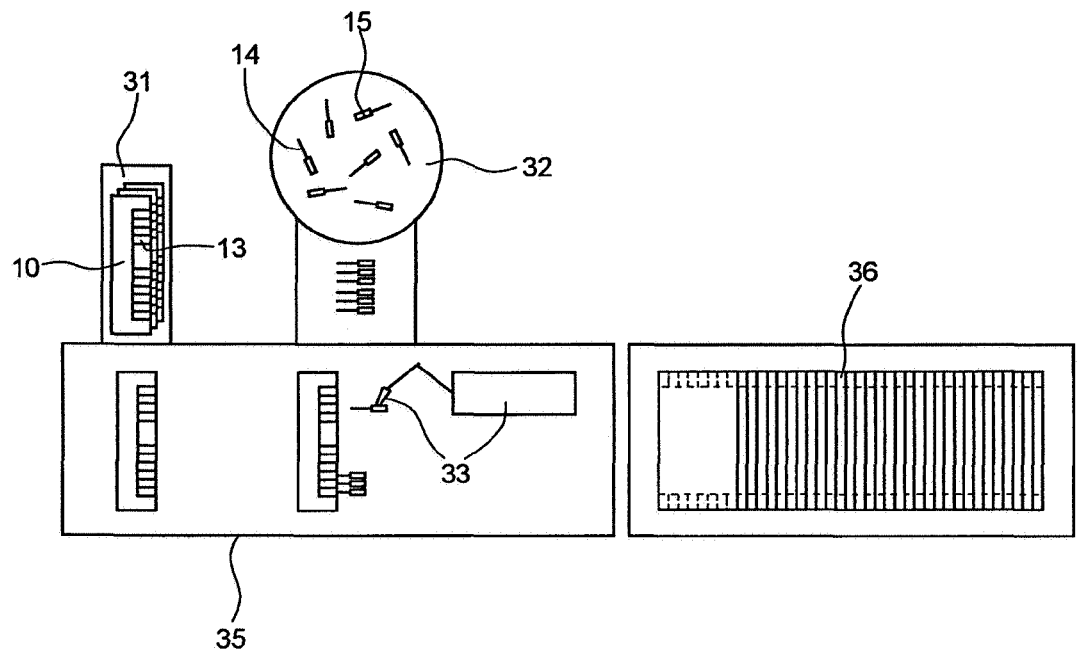
[Fig. 9]
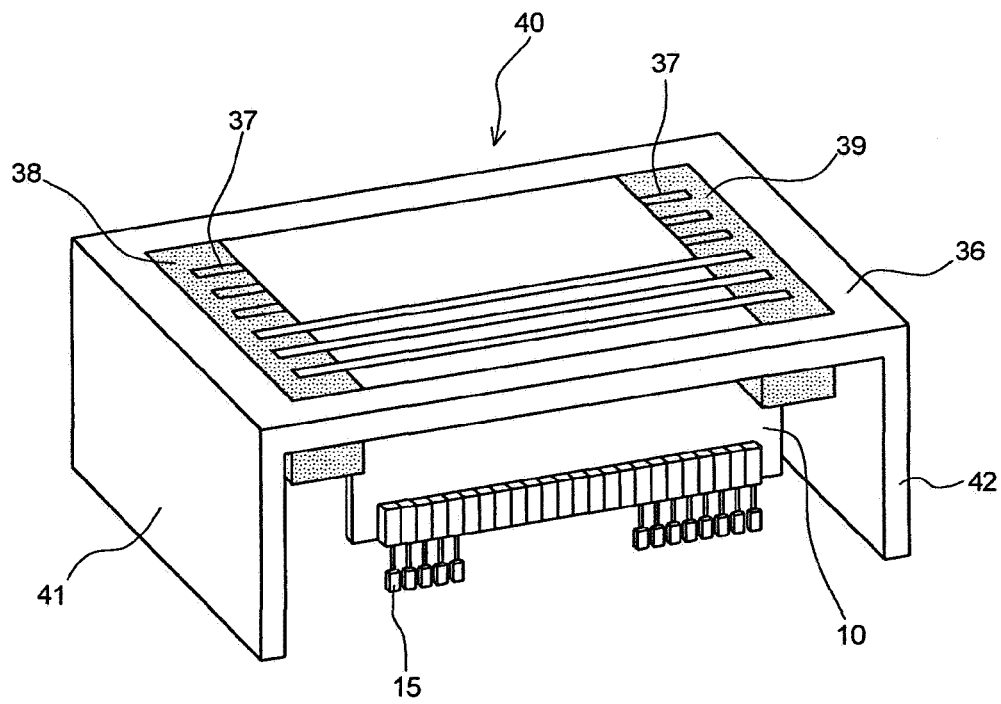

[Fig. 10]
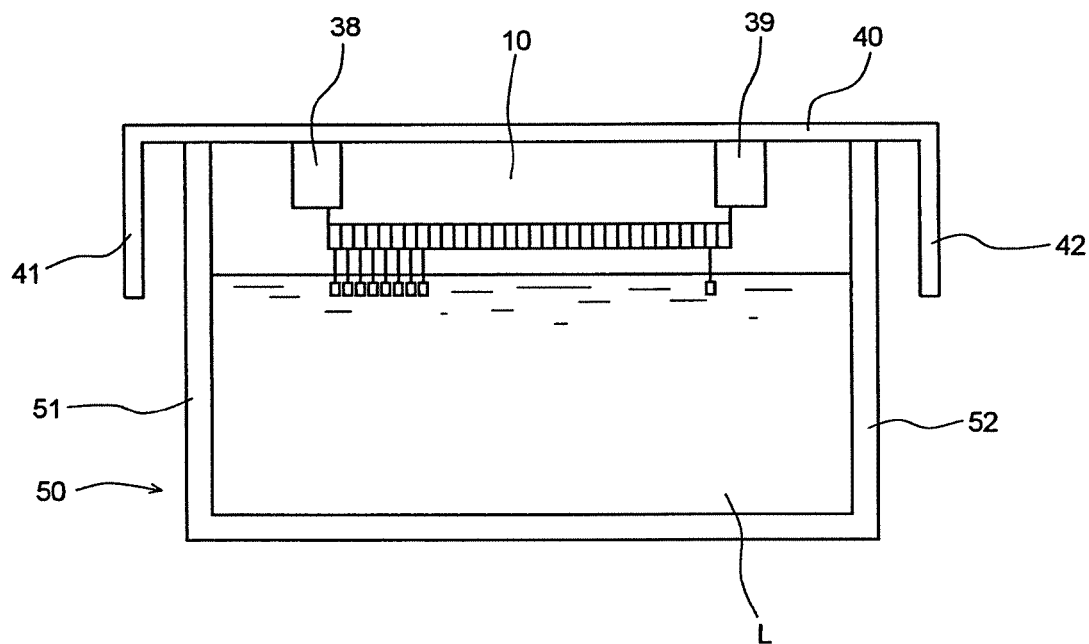
[Fig. 11]
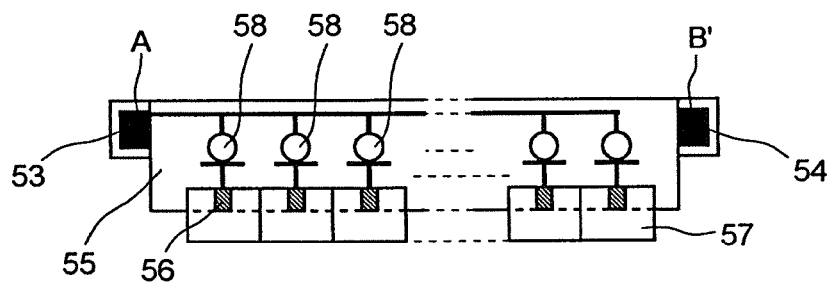
[Fig. 12]
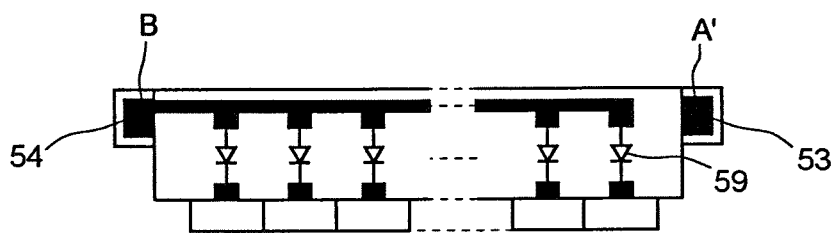

SOLID-ELECTROLYTE CAPACITOR MANUFACTURING DEVICE AND MANUFACTURING METHOD

TECHNICAL FIELD

The present invention relates to a production apparatus of solid electrolytic capacitor, especially, to a production apparatus of solid electrolytic capacitor which can form a dielectric layer, a semiconductor layer and an electrode layer sequentially on each of a plurality of conductors, and a solid electrolytic capacitor produced by using the apparatus.

BACKGROUND ART

As capacitors having a large capacitance and a low ESR (Equivalent Series Resistance) used in various electronic devices, aluminum solid electrolytic capacitors or tantalum solid electrolytic capacitors have been used.

A solid electrolytic capacitor is constituted by a primary electrode (conductor) made of an aluminum foil having micropores in its surface layer or of a sintered body of tantalum powder having fine pores in its inside, a dielectric layer formed on the surface layer of the electrode (having fine pores), and a secondary electrode (usually, a semiconductor layer) formed on the dielectric layer on which a conductor layer is formed. Generally, a lead wire is taken out from the primary electrode, and a terminal is connected to the lead wire and the conductor layer formed on the secondary electrode. To this lead wire and to the second conductive layer, terminals are connected respectively.

Conventionally, in mass production of such capacitors on industrial scale, two or more conductors as described above (such as aluminum foil and sintered body of tantalum powder) are soldered or welded to a metal long plate at even intervals and then this plate is subjected to treatments of forming dielectric body and semiconductors (Patent Document 1: Japanese Patent Application Laid-Open No. S60-249310).

Specifically, as shown in FIG. 1, lead wires 2 are taken out from conductors 1 for producing capacitors. The end of each of the lead wires is fixed with solder 4 onto a metal long plate 3 at even intervals. Thus, a member 5 for producing capacitors from which a plurality of conductors 1 hang down is prepared. Next, the conductors are immersed in a separately-prepared container containing a solution for chemical formation and by using the long plate as anode and an electrode present in the solution as cathode, electric current is passed, to thereby form a dielectric layer. Further, the conductors are immersed in a container containing a raw material for forming a semiconductor layer and in a container containing a solution for oxidizing the material to form a semiconductor alternately. Or, the conductors are immersed in a container containing a raw material for forming a semiconductor layer and by using an external electrode provided in the vicinity of conductors as anode and an electrode present in the contained as cathode, electric current is passed to thereby electrochemically laminate a semiconductor layer on the dielectric layer.

However, a semiconductor layer chemically formed by conventional method is, as compared with one formed by electrochemical method, has uneven in its thickness or the composition or continuity of the semiconductor layer itself is not constant (For example, in a case where the semiconductor layer is an electroconductive polymer, the polymer includes branches.) For these reasons, the semiconductor layer has a high resistivity and as a result, a capacitor thus produced has a disadvantage of a large ESR (Equivalent Series Resistance).

Moreover, in carrying out each step for electrochemical treatment, it is difficult to always provide an external electrode in the vicinity of each conductor at even intervals. That is, due to variation in locations of external electrodes, current values passed to the conductors cannot be uniform, rendering formation of semiconductor layers of thus produced capacitors not uniform and therefore, it has been difficult to produce capacitors having stable capacitance. This problem is irrelevant in production process which includes several or less conductors. However, it can be a major problem in production process which includes formation of semiconductor layers on industrial scale, for example, on several hundred of conductors at a time.

Furthermore, in a case where a metal long plate is used as anode in electrochemical formation of semiconductor layer, if a large amount of current is passed to one conductor (for example, to the leftmost conductor in FIG. 1), the current amount to be passed to the other conductors may become insufficient. For this disadvantage, forming uniform semiconductor layers have been sometimes difficult in some cases.

The present inventors have proposed a jig for producing capacitors which enables industrial-scale production process of solid electrolytic capacitors having narrow variation in capacitance, in which process formation of semiconductors layers is stable in case of electrochemically forming dielectric layers and a conductor layers on a plurality of conductors sequentially. However, the long plate the jig for producing capacitors uses is not a mere metal plate but a circuit board having constant current source. For example, if conductors (lead wires of conductors) were soldered onto this circuit board and the board were disposed after each production process, it would increase production costs. On the other hand, in order for the production jig to be repeatedly used in production, it can be considered, for example, to remove soldering and wash the board to clean the surface every time when one production process is completed. However, this approach is not advantageous on cost front. Further, in order for each of product capacitor elements to be taken out from the production jig, it is necessary to heat soldered portion to thereby remelt the soldering or to stress the soldered portion to thereby peel off the element together with soldering from the plate. However, such a process sometimes results in removal of soldering attached onto the end of the lead wire of the product capacitor element.

[Patent Document 1]
Japanese Patent Application Laid-Open No. S60-249310

DISCLOSURE OF INVENTION

Problems to be Solved by Invention

Accordingly, the present invention provides an apparatus for producing solid electrolytic capacitors which enables industrial-scale production of capacitors having a high capacitance and a low ESR, particularly an apparatus for producing solid electrolytic capacitors which enables the production process to be simple and continuous by connecting conductors to the jig stably at low cost.

Means for Solving the Problems

As a result of intensive studies with a view to solving the above problems, the present inventors have found out that a group of capacitors having narrow variation in capacitance can be efficiently produced by temporarily fixing conductors to the jig for producing capacitors, providing sockets for the purpose of passing currents through lead wires and continuously conducting the series of steps from fixing conductors to the production jig to treatment of conductors, thereby completed the invention.

That is, the present invention provides a production apparatus of capacitors and a production method as follows.

1. An apparatus for producing solid electrolytic capacitors, in which a plurality of conductors for producing solid electrolytic capacitors are fixed to a jig for producing capacitors, the jig is transferred to above treatment baths to immerse the conductors in treatment solution in each of the baths sequentially and electric currents are passed to the conductors therein to thereby form a dielectric layer and a semiconductor layer sequentially on each of the conductors, the jig for producing capacitors comprising a plurality of sockets provided thereon for fixing ends of wires leading out of the conductors, wherein the ends of the lead wires are inserted and fixed into the sockets by using a robotics device.

2. The apparatus for producing solid electrolytic capacitors according to 1, further comprising a let-off device which accommodates a plurality of the jig for producing capacitors and lets off one by one to the next operation stage intermittently.

3. The apparatus for producing solid electrolytic capacitors according to 1 or 2, further comprising a lining-up device which aligns the conductors for producing solid electrolytic capacitors to face the same direction 4. The apparatus for producing solid electrolytic capacitors according to 3, wherein the robotics device fixes the conductors for producing solid electrolytic capacitors having been aligned by the lining-up device one by one or plurality by plurality by inserting the lead wire of each of the conductors into the sockets provided on the jig for producing capacitors on the operation stage.

5. The apparatus for producing solid electrolytic capacitors according to any one of 1 to 4, comprising a transfer device which transfers the jig for producing capacitors to above the treatment baths on completion of the insertion/fixation of the wires of the conductors into the sockets of the jig.

6. The apparatus for producing solid electrolytic capacitors according to any one of 1 to 5, comprising racks having a plurality of slots for vertically holding the jigs for producing capacitors and further comprising an inserting device which inserts each of the jigs for producing capacitors into slots of the rack on completion of fixation of the conductors to the jig.

7. The apparatus for producing solid electrolytic capacitors according to any one of 1 to 6, wherein the treating baths include a treating bath for forming a dielectric layer, the transfer device transfers the jigs for producing capacitors or the racks for holding a plurality of the jigs to above each of the treating baths sequentially and brings down the jigs or the racks toward each treating solution to thereby immerse the conductors hanging down from the jigs in the treating solution for a predetermined period of time, and electric current is passed thereto through the sockets to thereby form a dielectric layer.

8. The apparatus for producing solid electrolytic capacitors according to any one of 1 to 7, wherein the treating baths include a treating bath for forming a semiconductor layer, the transfer device transfers the jigs for producing capacitors or the racks for holding a plurality of the jigs to above each of the treating baths sequentially and brings down the jigs or the racks toward each treating solution to thereby immerse the conductors hanging down from the jigs in the treating solution for a predetermined period of time, and electric current is passed thereto through the sockets to thereby form a semiconductor layer.

9. The apparatus for producing solid electrolytic capacitors according to any one of 1 to 8, further comprising a remover device which dismounts the capacitors together with the lead wires from the sockets of the jig after forming an electroconductive layer on the conductor surface.

10. The apparatus for producing solid electrolytic capacitors according to any one of 1 to 9, wherein the jig for producing capacitors comprises a circuit for applying current equally to each of the conductors.

11. The apparatus for producing solid electrolytic capacitors according to 10, wherein the circuit has a diode whose cathode side is connected to each connecting terminal of the conductive sockets and a discharge-type constant current source whose output side is connected to each terminal.

12. The apparatus for producing solid electrolytic capacitors according to any one of 1 to 11, wherein each of the lead wires of the conductors has a washer made of insulative polymer at its base part.

13. A method for producing solid electrolytic capacitors, using the production apparatus described in any one of 1 to 12.

14. A solid electrolytic capacitor produced by the method for producing solid electrolytic capacitors described in 13.

Effect of Invention

According to the present invention where capacitor-production jigs which applies current to each conductor under a uniform condition can be repeatedly used, capacitors having a narrow variation in capacitance and a good ESR value can be efficiently produced at low costs. Moreover, since the whole process can be automated, mass-production of capacitors having a narrow variation in capacitance and a good ESR value is possible.

BEST MODE FOR CARRYING OUT INVENTION

The apparatus for producing solid electrolytic capacitors according to the present invention is markedly characterized in (1) that the capacitor-production jigs have sockets provided thereon for lead wires of conductors to be fixed thereto, and (2) that the whole production process can proceed continuously by using the capacitor-production jigs having a plurality of conductors fixed thereto. Hereinbelow, the invention is described in detail by referring to drawings attached hereto.

Firstly, the above technical feature (1) of the present invention is explained.

As shown in FIG. 2(a), capacitor-production jig 10 of the present invention consists of insulative substrate 11 having a plurality of terminals 12 (which are covered with sockets 13 and are invisible on the surface). Mounted on the position corresponding to each of the terminals is a socket 13. As shown in FIG. 2(b), conductor 15 with a lead wire 14 leading out therefrom is connected to each socket. The capacitor-production jig 10 serves a supporting member in forming a dielectric layer and a semiconductor layer (and when necessary, an electrode layer) sequentially on each conductor 15 after the lead wire 14 is inserted into the socket. Generally, electrodes A and B for electric current application are provided on ear parts projecting from both ends of the insulative substrate 11. (Electrodes may be provided on other parts on the substrate when ear parts are not prepared.)

Generally, socket 13 is a conductive socket. That is, as shown is FIG. 3 which is a S-S' sectional view of FIG. 2(b), socket 13 has a metal-made contact part 16 into which lead wire 14 is inserted and connected, substrate-mounted part 17 electrically connected to contact part 16 and an insulative resin component 18 for covering these components. The socket is mounted on the insulative substrate 11 in a manner that the substrate-mounted part 17 of a socket can be electrically connected to each terminal 12 present on the insulative substrate 11.

In FIG. 3, the metal-made contact part 16 is illustrated as a tubular conductive body and the substrate-mounted part 17 is illustrated as a conductive body linked with part of the contact part 16 and exposed to the outside. However, contact part 16 and substrate-mounted part 17 may be used in any manner as long as they can serve as a conductive socket. For example, contact part 16 may be a conductive body provided in a form of ring or strip on an inner wall of a hole into which a lead wire 14 is inserted. Alternatively, it may be a socket type sandwiching a lead wire inserted 14 between two metal plates (preferably plate springs) facing with each other. Substrate-mounted part 17 may be in form of wire or may be a spring so that it can surely contact a terminal 12 provided on insulative substrate 11. Alternatively, contact part 16 and substrate-mounted part 17 may be integrated to form a structure where a lead wire may be directly pressed onto terminal 12. The size of a socket is not limited as long as a sufficient length of a lead wire can be inserted into it and fixed therein. Although it depends on the length of the lead wire from the conductor and the mass of the conductor, insertion inlet of a socket generally has a length of 3 mm or more, preferably 4 mm or more. In a case where springs or the like measures are used to sandwich the lead wire, the length can be shorter.

Preferably, a plurality of conductive sockets 13 are connected to a plate as shown in FIG. 2 to form a plate member (hereinafter referred to as socket plate). The sockets are fixed thereon so that substrate-mounted part 17 of each socket may be electrically connected to terminal 12 on insulative substrate 11. Soldering may be employed for this electric connection or the socket plate may be pressure-fixed onto insulative substrate 11 by using screws or clips. Examples of such a socket plate include PCB Receptacle manufactured by PRECI-DIP SA (2.54 mm-pitch 64 pin sockets) and a product manufactured by Mac-Eight Co., Ltd. having 2.54 mm-pitch 64 sockets.

In a case where a conductive material in contact part 16 of socket 13 or conduction between substrate-mounted part 17 and terminal 12 is deteriorated by steam or vapor from chemical formation solution at the time of forming a dielectric layer or from a liquid used at the time of electrolytic polymerization, a method in which another socket plate 20 having the same number of sockets is connected to the socket plate 19 mounted on an insulative substrate 11 as shown in FIG. 4 and socket plate 20 is exchanged with another one when necessary may be employed for the purpose of saving costs of replacing capacitor-production jigs 10.

Alternatively, the above explains an embodiment where sockets 13 (socket plate 19) are connected to terminals 12 on insulative substrate 11. As shown in FIG. 5, socket part 21 may be formed integrally with substrate 11. In this case, a secondary socket plate 20 as described above may be lined to the socket part 21.

Jig 10 comprises a circuit preferably distributing substantially uniform current to each terminal 12 for forming a dielectric layer and further at least one layer of semiconductor layer by electrolytic polymerization (The circuit is typically shown as C enclosed in a dashed line rectangle in FIG. 3.). The uniform-current circuit C is a circuit which passes current substantially uniformly to each socket. Typically, such a circuit is described in International Patent Publication No. WO2005/006360 pamphlet. Examples include a circuit having on terminal of each socket a rectifier diode connected with cathode and a circuit having on terminal of each socket a discharge-type constant current source connected with the output side. As a discharge-type constant current source, a constant current diode or an electrolysis-effect type transistor.

There is no particular limitation on the conductor as long as the conductor has a structure which can be equipped with a lead wire. There is no particular limitation on the shape of the conductor and conductors in form of foil, sheet or bar or in a form obtained by pulverizing a conductive material and molding it or sintering it after molding may be used. A conductor formed by attaching powdery conductive material onto a foil-shaped or sheet-shaped metal and sintering it may be used. Conductors may have fine pores provided by subjecting the conductor surface to etching treatment or the like. In a case where a conductor is prepared by pulverizing a conductive material and molding it or sintering it after molding, fine pores can be provided inside the after-molded or after-sintered body by selecting an appropriate pressure at the time of the molding step. Preferred examples of conductive material used in the present invention include aluminum foil having etched surface; tantalum powder, niobium powder and an alloy powder containing as its main component tantalum; an alloy powder containing niobium as its main component; and a sintered body having a number of fine pores inside the body obtained after sintering niobium monoxide powder and sintering it. In a case where a metal is used as conductor, the metal may be used after subjecting it partially to at least one treatment selected from carbonization, phosphiding, boronization, nitriding and sulfidizing.

By preparing a conductor in form of a sintered body from a powder having a small particle size, a sintered body having a large specific surface area per mass can be provided.

Any lead wire having strength suitable for insertion operation into a socket may be used.

The lead wire can be connected directly to a conductor prepared in advance by soldering or the like. In a case where a conductor is prepared by pulverizing a conductive material and molding it or sintering it after molding, part of a lead wire prepared separately may be molded together with the conductor at the time of sintering and the part of the lead wire outside the molded body may be used as lead wire. Also, by leaving a part of the conductor without a semiconductor layer formed thereon, a lead wire can be connected to the part. On a boundary portion between the part without a semiconductor layer formed thereon and the portion having a semiconductor layer thereon, insulating resin may be attached and cured in a belt-like manner for the purpose of preventing crawling-up of semiconductor layer. Further, by inserting a washer made of insulative resin (e.g., fluorine resin such as tetrafluoroethylene and silicone resin) into the foot portion (the part contacting to the conductor) of the lead wire, a semiconductor layer can be prevented from crawling up.

Insertion of lead wires into sockets is carried out by using a robotic device. Typically, the robotic device is a fastener means (not shown in figures) having a holding part at the end part, which fixes jig 10 at a predetermined position, picks up conductor 15 having a lead wire by movable arm 23 having a holding part (chuck) 22 to hold the conductor, transfers it to a position corresponding to socket 13 and pressed the lead wire into the socket. (FIG. 6 (a))

The structure of the robotic device may be arbitrarily selected. For example, a device which houses a plurality of conductors 15 in basket 24 and inserts the conductors into a plurality of sockets 13 at a time by movable arm 23 may be used. Other than this, for example, a device with a structure which fixes jig 10 at a predetermined position and puts the conductors 15 each having a lead wire on a guide rail which may have a roller and/or a belt to transfer the conductors to inlet parts of sockets to thereby insert the lead wire of the conductor one by one or in groups into the sockets by using a chuck or a pusher (not shown in figures) may be used. It is preferable that a mechanism where insertion position is constant and inlet parts of connection sockets provided on the circuit board move a constant distance be provided, so that the machine can be manufactured with low costs.

Hereinafter, the above technical feature (2) of the present invention is described.

FIG. 7 is illustration typically showing one example of the apparatus of the present invention. Simply put, the apparatus of the present invention 30 comprises four operation parts, that is, let-off device 31, array device 32, robotic device 33, transfer device 34 and operation stage 35.

Let-off device 31 accommodates a plurality of capacitor-production jigs 10 having sockets 13 mounted thereon and let off the jigs one by one intermittently onto operation stage 35. Into array device 32, conductors 15 each having a lead wire (anode lead) 14 are placed and as shown in figures, the conductors aligned to face the same direction are transferred to operation stage 35. The jig 10 let off by let-off device 31 to operation stage 35 advances to the position where conductors are inserted. On the other hand, conductors 15 let off and aligned by array device 32 are picked up by robotics device 33 to insert each lead wire 14 of the conductors insert each inlet of sockets 13. After all the sockets 13 are connected with the conductors 15, the capacitor-production jig 10 is transferred to transfer device 34. The transfer device 34 transfers the capacitor-production jig 10 to above treatment bath 50 (though the figure shows only one bath, two or more treatment baths are usually employed in the present invention), and according to a predetermined scheme, immersion of conductors and applying current are conducted therein to form a dielectric layer and a semiconductor layer. The treatments bath may include a paste bath and in such a case, a conductive layer can be formed on the semiconductor layer.

Hereinafter, structures of let-off device 31, array device 32, robotics device 33, transfer device 34 and operation stage 35 are specifically explained respectively.

As described above, let-off device 31 accommodates a plurality of capacitor-production jigs 10 and lets off the jigs sequentially and intermittently to operation stage 35. Capacitor-production jig 10 is, as shown in FIG. 2 and Figures thereafter, a plate member on which a plurality of sockets 13 are provided in a line along one side. The let-off device 31 may be any type as long as it can let off such plate members sequentially and intermittently.

One example may be a let-off device of stepped rack type, in other words, magazine-rack type which accommodates capacitor-production jigs 10 in a vertical direction with a regular interval between the jigs. the magazine rack type device has a rectangular solid shape generally and the inside of the magazine rack type device comprises a plurality of compartments and at least one face of each compartment is open so that goods may be placed in the compartment or taken out of the compartment or the face of each compartment has a lid which can be open or closed appropriately. The let-off device 31 comprises an elevator for moving up and down the whole magazine rack. At the first phase, each capacitor-production jig 10 is placed and accommodated in each compartment. The top (or bottom) compartment of the magazine rack is on the same level with stage 35, and in initiating the production process, the capacitor-production jig 10 in the top (bottom) compartment is pushed out onto stage 35 by a pushing device (pusher). Alternatively, the rack may be equipped with a movable roller or a holding means (for example, a chuck) to send out the capacitor-production jigs 10 from the compartments toward stage 35 by using either one of them or combination of them.

After the capacitor-production jig 10 in the top (bottom) compartment of the magazine rack has been sent out, the elevator is activated to move up (down) the magazine rack by a height of one compartment so that the second compartment from the top (bottom) becomes on almost the same level with stage 35 and the next capacitor-production jig 10 is sent out onto stage 35 at a good timing in the same manner with the above. Thereafter, the remaining jigs in the magazine rack are sent out sequentially in the same manner.

Array device 32 is, as aforementioned, a device for aligning a plurality of conductors 15 placed therein in one direction as illustrated and transferring the conductors to operation stage 35. Examples thereof include array devices commercially available under a generic name "parts feeder". Such a device uses a built-in oscillation mechanism to accommodate small parts (in the present invention, conductors) which have been randomly placed therein in continuously provided pockets on a straight portion in the device so that the parts may be line up in one direction.

The structure of robotics device 33 is as already explained above.

Transfer device 34 holds and transfers capacitor-production jig 10 connected with conductors as described above to above each of treatment baths, brings down each jig so that an appropriate part of the conductors can be immersed in treatment solution, and further transfers the jig to another treatment bath. The device is a transfer crane comprising some holding means (for example, a chuck).

Besides the above type which transfers the capacitor-production jigs 10 one by one, transfer device 34 may be another type of device having a mechanism where a plurality of jigs are accommodated in a rack 36 and then the whole rack 36 is transferred (FIG. 8). Although transfer device 34 is omitted in order to clearly show rack 36 in FIG. 8, the structure of the transfer device is the same with the structure shown in FIG. 7 except that the device holds and transfers rack 36 instead of each jig 10. That is, after jigs 10 are inserted into rack 36, the rack is transferred to above a treatment bath (not shown in FIG. 8) by using an appropriate transfer means (such as crane or conveyer).

As the rack, frame member 40 having in its both side, edge-receiving blocks 38 and 39 with grooves 37 for receiving the edges of jig 10, as shown in FIG. 9, may be used (FIG. 9 shows an embodiment where only some of the grooves hold jigs 10 inserted therein.). It is preferable that frame member 40 have legs 41 and 42 for the purpose of making the following operations easier. Legs 41 and 42 have enough length so that conductors 15 can remain suspended from each jig 10 when the jigs are inserted into the grooves. Moreover, it is preferable that frame member 40 have enough width so that the frame member 40 can straddle walls 51 and 52 of a treatment bath 50 when the jig is brought down from above the treatment bath 50. The edge-receiving blocks 38 and 39 hold the jigs 10 at a height where only conductors 25 can be immersed in treatment solution L to an appropriate depth when frame member 40 is placed on the walls of the both sides of the bath (see FIG. 10 sectional view).

It is preferable that edge-receiving blocks 38 and 39 be made of insulating material such as synthetic resin (for example, fluorine resin). For the purpose of applying current to electrode of jig 10, an electrode is provided at a corresponding position. In a case where capacitor-production jig 10 is T-shaped as a whole as shown in FIG. 2, groove 37 may be bottomed at least in part to thereby support the extended portions (ear parts) of jig 10. Instead or in addition, the blocks may comprise a mechanism for fixing capacitor-production jigs 10. As such a fixation mechanism, a spring structure or a fastener means may be provided in the groove. Or capacitor-production jig 10 may have holes provided on both ends so that a bar member may be inserted into each of the holes with each jig edge being inserted in the groove so that the bar member may penetrate through edge-receiving blocks 38 and 39 and the jig to fix the jig. Such a fixing portion may function as electrode.

In order to insert capacitor-production jigs 10 into rack 36, for example, an array device of magazine-rack type similar to that of let-off device 31. That is, the capacitor-production jigs 10 with all the sockets thereon being connected with conductors are sequentially transferred to a predetermined position by a roller and/or a guide rail which may have a belt, to thereby be inserted in each pair of grooves.

In a case of using a magazine rack type, usually, transfer from operation stage 35 to rack 36 is carried out on the same plane. At this point of the process according to the present invention, since capacitor-production jigs 10 are connected via lead wires to conductors, each capacitor-production jig 10 on operation stage 35 is rotated 90 degrees at a predetermined position in a manner not bending lead wires and kept in a vertical direction. Then, the jigs are sequentially inserted into grooves of rack 36. In rotating the capacitor-production jig 10 90 degrees, for example, a method including combination of motor drive and cam mechanism where the jig 10 is brought on at least one L-shaped jig and then the jig is rotated by rotating the L-shaped jig 90 degrees may be used. By pushing out the jig 10 rotated 90 degrees with a pusher provided in the vicinity of the L-shaped jig, the jig 10 is separated from the L-shaped jig and after bringing the jig on grooves of rack 36, the jig 10 is pushed to be inserted into the grooves, for example by another pusher.

Operation stage 35 may have an arbitrary structure suitable for transferring components. For example, in operation stage 35, a guide rail which may have a roller or a belt for transferring jigs 10 to a predetermined position and various pushers required for inserting or positioning of jigs are provided. Further, although not shown in Figures, transferring jigs 10 or conductors to the path can be controlled by a computer device (CPU) and according to changes made to the program, motions or times for transfer may be set arbitrarily.

In FIGS. 7 and 8, operation stage 35 is illustrated as a rectangular plane. It may have a circular shape or a round shape where let-off device 31, array device 32, robotics device 33 and transfer device 34 are sequentially provided. Operation stage 35 may be a turntable type and the jigs 10 having been transferred from let-off device 31 onto operation stage 35 may be transferred to a position corresponding to array device 32 by rotating the stage by appropriate degrees, to insert conductors there and further, the stage can be rotated so that the jigs can reach the position where transfer device 34 is provided.

Furthermore, in addition to the above devices, a device which removes the produced solid electrolytic capacitors from the sockets may be provided. Such a remover device may have a mechanism which one or a plurality of solid electrolytic capacitors are picked to be removed from sockets in a similar manner as the electrolytic capacitors are inserted and fixed into the sockets.

In each of the above devices, sensors are provided at positions required for the purpose of acknowledging operation process and positions of the components. For example, in predetermined positions of magazine rack and operation stage 35 and in transfer device 34, sensors for detecting the positions and image processors are provided, to thereby acknowledge the progress in letting out jigs 10, connecting conductors to sockets and inserting jigs 10 into transfer device 34. A counter which counts the number of jigs 10 and conductors brought into production process and the number of jigs being carried to transfer device 34 may be provided at a predetermined position in operation stage 35. Further, sensors or gauges for detecting the liquid level, temperature or the like in treatment baths may be included. A correction mechanism in which, for example according to conditions detected by these sensors, defective semi-products are eliminated or solution is added to the bath may be provided.

Furthermore, for the above sensors and individual movable mechanisms, means known to one of ordinary skill in the art may be employed. For example, various optical sensors (such as infrared radiation sensor) or pressure-sensitive sensors (such as piezo-element sensor) may be used. Further, as movable mechanism within a certain range, stepping motor or the like may be used.

EXAMPLES

Hereinafter, the present invention is described in greater detail by referring to Examples. However, the present invention is not limited by the following Examples.

The conductors used in Examples are rectangular sintered bodies of 1.0×1.51×4.45 mm (powder mass: 41.4 mg) each obtained by molding tantalum powder having CV value of 150000 µF·V/g together with 0.4 mmϕ tantalum wire (lead wire) and vacuum-sintering it at 1320° C. The lead wire was provided such that 10 mm of the tantalum wire led out from the center of the 10×1.51 mm surface and 3.8 mm of the wire was included inside the sintered body.

Example 1

Capacitor Production Apparatus

By the following procedures, a capacitor-production jig having sockets was prepared.

On a circuit board 55 having ear parts of 8 mm×23 mm (53 and 54 in FIGS. 11 and 12) on both ends in the longitudinal direction of 194×33 mm rectangular glass-blended epoxy substrate (thickness 1.6 mm), a circuit for applying uniform current was provided as follows such that external terminals 56 are placed at 2.54 mm intervals. Then, to the 2.54 mm-pitch external terminals (64 through-holes), PM-50, (manufactured by MAC Eight Co., Ltd.) as 64-pin sockets 57 were fixed by soldering such that each of the surface-mounted terminals corresponded to each of the external terminals.

On the front surface of the circuit board, 64 constant current diodes 58 were mounted and aligned at even intervals. Here, each cathode of the constant current diodes was connected to each of the external terminals while each anode of the constant current diodes was allowed to lead to 8×22 mm electrode terminal for semiconductor (electrode terminal A in FIG. 11) provided on one of the ear parts. On the other hand, on the rear surface of the circuit board, 64 rectifier diodes 59 were mounted and aligned at even intervals. Each cathode of the rectifier diodes was connected to each of the external terminals, while each anode of the rectifier diodes was connected with each other on the circuit and was allowed to lead to 8×22 mm electrode terminal for chemical formation (electrode terminal B in FIG. 12) provided on the other ear part, in a manner which the connection could be observed through from the front surface. The two electrode terminals A and B were respectively connected via through-holes provided in the electrode parts on the board to electrode terminals (A' in FIG. 12 and B' in FIG. 11) each having the same area (8×22 mm) provided at corresponding positions on the opposite surface of each of the electrodes A and B.

The apparatus in Examples is constituted by providing the following let-off device, array device, robotics device and transfer device around an operation stage.

The let-off device is a multi-tier casing (a magazine-rack type) having pitches of 6 mm between the tiers. In the magazine rack, each compartment supports a capacitor-production jig with a roller and the whole rack moves up and down by an elevator so that the jigs can be let off sequentially from the top compartment.

As the array device, a commercially available parts feeder which aligns conductors by use of vibration is used. In this device, each of the conductors is placed in each pocket on a straight portion such that all the conductors are aligned to face the same direction.

The robotics device comprises a means for carrying the conductors aligned by the array device on a guide rail to transfer them to a predetermined position and a means for picking up the conductors one by one to insert them into sockets. The device has a structure as shown in FIG. 6 (a).

The transfer device comprises a rack in FIG. 9 into which jigs with conductors being connected thereto are vertically inserted such that the conductors may be in the downside and the rack has two edge-receiving blocks for receiving the electrode part of the ear parts of the jigs. Each of the edge-receiving blocks is a tetrafluoroethylene member of 650 mm (length)×10 mm (width) having 1.7 mm-long incisions with a pitch of 8 mm into which electrode parts of the circuit boards are inserted, and the pair of blocks is designed to receive 80 of such circuit boards. Each of the two edge-receiving blocks has an electrode for applying current at a position corresponding to the electrode of the circuit board.

The transfer device 34 comprises a crane for picking up the rack accommodating jigs and transferring it to above treatment baths, thereby a dielectric layer and each conductive polymer layer are formed by using monomers such as pyrrole and 2,4-ethylenedioxythiophene through electrolytic polymerization.

The operation stage comprises a component group mainly consisting of a guide rail for carrying the circuit boards let off from the let-off device one by one and a guide rail for carrying the conductors aligned in the same direction sent out from the array device and a turning means for rotating jigs having conductors thereto by 90 degrees, various sensors for detecting the operations of the components and a computer which controls them.

Example 2

Example of Capacitor Production

By using the above production apparatus, according to the method described in the International Patent Publication Pamphlet of No. WO2005/006360, capacitors were produced. It was specifically described below.

1. Production of Capacitor-Production Jigs

On one surface (hereinafter referred to as front surface) and the other surfaces (hereinafter referred to as rear surface) of a 320 mm-long 30 mm-wide polyimide substrate, a circuit as shown in FIGS. 11 and 12 was formed. Onto the front surface, a PCB receptacle (2.54 mm-pitch 64 pin sockets) was attached to be electrically connected with the above circuit. As constant current diodes 58, those of 40 μA or less were selected from products of E-101L series manufactured by Ishizuka Electronics Corporation. As rectifier diodes 59, those of 10D-1 manufactured by Nihon Inter Electronics Corporation were used.

2. Production of Capacitors

Tantalum sintered bodies each having CV value of 80000 μF·V/g (size: 4×3×1 mm, mass: 72 mg, with 7 mm of a 0.29 mmϕ lead wire appearing from the surface) were used as conductors. On the lead wires, tetrafluoroethylene washer was attached on each lead wire for preventing crawling-up of solution at the time of formation of a semiconductor layer carried out later. The thus pretreated conductors were connected to the sockets of the capacitor-production jig by using the apparatus described in Example 1. Ten of the capacitor-production jigs were prepared (640 conductors in total were connected to the jigs), and the jigs were set in a frame which could accommodate jigs in parallel at 7 mm intervals (=a metal frame which holds the right and left side ends of each capacitor-production jigs, the right and left parts holding the jig were electrically insulated with each other, the left being electrically connected to one terminal on the front surface of the jig for forming a semiconductor while the right being electrically connected to the power feeding terminal on the rear surface of the jig for chemical formation).

First, this frame was placed on a chemical formation bath containing 0.1% phosphoric acid aqueous solution such that the whole of the conductors and part of each of the lead wires were immersed in the solution. By using the feeding terminal for chemical formation provided on the rear surface of each capacitor-production jig as anode and an external electrode (tantalum sheet) provided in the bath as cathode, chemical formation was conducted at 80° C. for 10 hours under applied voltage of 10 V, to thereby form a dielectric layer of $Ta_2O_5$ on the conductors and the part of each lead wire. The frame was pulled up from the bath, washed with water and then dried at 100° C.

Next, by repeating twice or more times operations of immersing the frame alternately into a bath containing 20% sodium molybdate aqueous solution and a bath containing 10% sodium borohydride aqueous solution such that conductors were immersed in the solutions, minute electrically-defective parts were created on the dielectric layer.

Subsequently, the frame was placed on a bath (a tantalum foil was attached onto the bath itself to serve as an external electrode) containing solution for formation of a semiconductor layer (0.2 M of anthraquinone sodium sulfonate and a mixed solution of water and 20% ethyleneglycol containing ethylene dioxythiophene blended therein at an amount enough for insoluble part to be present therein) such that the conductors could be immersed in the solution. By using the terminal of the constant current diode as anode and an external electrode as cathode, current was applied to the terminal at 8 V for 1 hour to thereby form a semiconductor layer. The frame was pulled up from the bath, washed with ethanol and then dried at 100° C. Further, the frame was placed on the chemical formation bath such that the conductors were immersed in the solution. By using the feeding terminal for chemical formation, chemical formation was again conducted at 80° C. for 1 hour under applied voltage of 7 V. The frame was pulled up from the bath, washed and then dried at 100° C. After these operations of formation of semiconductor layer and rechemical formation were conducted 10 times in total, the frame was placed on a bath containing carbon paste and then on a bath containing silver paste such that the conductors were immersed in the pastes and then the frame was dried, to thereby laminate an electrode layer on the semiconductor layer.

Each of the conductors having an electrode layer formed thereon was removed from the capacitor-production jig and of the two convex parts of a separately prepared tin-plated lead frame (with 2 μm of nickel plating as base plating and 1 μm of tin plating thereon), the lead wire of each conductor was placed on one serving as the anode side and silver paste side of the conductor was placed on the other serving as cathode side. The former was connected by spot welding and the latter was connected with silver paste. As silver paste, composition containing 17 mass % of bismaleimide resin and silver powder 83 mass % was used. Then, the whole except for a part of the lead frame was sealed with epoxy resin (the lead frame was cut at a predetermined position outside the epoxy resin sealing and then subjected to bending process), to thereby produce chip capacitors each having a size of 7.3× 4.3×1.8 mm. The obtained capacitors had a capacitance of 480 μF at a rated voltage of 2.5 V. The capacitance distribution included 531 capacitors having CV of 470 to 490 μF, 75 capacitors having CV of 490 to 510 μF, 2 capacitors having CV of 510 to 530 μF, 30 capacitors having CV of 450 to 470 μF and 2 capacitors having CV of 430 to 450 μF.

In the following Table, the results of the present invention were shown in comparison with the results of Example 1 of the International Patent Publication No. WO2005/006360 pamphlet (where the apparatus of the present invention was not used and the lead wires were attached to the jigs by welding). Example 1 of the International Patent Publication No. WO2005/006360 pamphlet realized production of capacitors with narrow variation in capacitance. From the results, it is confirmed that unexpected effects that production process can be more efficient and further that uniformity of products can be further improved can be achieved by using the production apparatus and the method according to the present invention.

TABLE 1

Comparison in capacitance variation of capacitors

| Capacitance | Production example of the present invention (number of capacitors) | WO2005/006360 Example 1 (number of capacitors) |
|---|---|---|
| 430~450 μF | 2 | 3 |
| 450~470 μF | 30 | 39 |
| 470~490 μF | 531 | 469 |
| 490~510 μF | 75 | 85 |
| 510~530 μF | 2 | 4 |
| Total | 640 | 600 |

BRIEF DESCRIPTION OF DRAWINGS

FIG. 1 A perspective view typically showing a long plate to which conductors are attached by soldering, used in conventional process of solid electrolytic capacitor production.

FIG. 2 Perspective views showing a jig for producing solid electrolytic capacitors on which sockets are mounted, used in the production apparatus of the present invention. FIG. 2(a) shows a state before connecting conductors to the jig and FIG. 2(b) shows a state after connecting conductors to the jig.

FIG. 3 An S-S' sectional view of FIG. 2.

FIG. 4 A perspective view showing another embodiment of a jig for producing solid electrolytic capacitors on which sockets are mounted, used in the production apparatus of the present invention.

FIG. 5 A perspective view showing still another embodiment of a jig for producing solid electrolytic capacitors on which sockets are mounted, used in the production apparatus of the present invention.

FIG. 6 Perspective views showing modes of inserting conductors into a jig for producing solid electrolytic capacitors on which sockets are mounted, used in the production apparatus of the present invention. FIG. 6 (a) shows a mode of inserting the conductors one by one while FIG. 6(b) shows a mode of inserting a group of conductors at a time.

FIG. 7 A view typically showing the whole apparatus for producing solid electrolytic capacitors of the present invention.

FIG. 8 A view showing another embodiment of the whole apparatus for producing solid electrolytic capacitors of the present invention.

FIG. 9 A view typically showing a structure of the frame material (in a state that some jigs for producing solid electrolytic capacitors have been inserted in the frame) used in the apparatus for producing solid electrolytic capacitors of the present invention.

FIG. 10 A view typically showing a state that the frame straddles a treatment bath, in the apparatus for producing solid electrolytic capacitors of the present invention.

FIG. 11 A plane view showing a circuit structure (on the front surface) of a jig for producing solid electrolytic capacitors used in the apparatus for producing solid electrolytic capacitors of the present invention.

FIG. 12 A plane view showing a circuit structure (on the rear surface) of a jig for producing solid electrolytic capacitors used in the apparatus for producing solid electrolytic capacitors of the present invention.

EXPLANATIONS OF REFERENCE NUMBERS 1 conductors
2 lead wire
3 long metal plate
4 soldering
5 metal plate with conductors attached thereto
10 jig for producing solid electrolytic capacitors
11 insulative substrate
12 terminal
13 sockets
14 lead wire
15 conductors
16 contact part
17 substrate-mounted part
18 insulating resin part
19 socket plate
20 socket plate
21 socket
22 chuck
23 arm
24 basket
31 let-off device
32 array device
33 robotics device
34 transfer device
35 operation stage
36 rack
37 groove
38 & 39 edge-receiving blocks
40 frame member
41 & 42 legs
50 treatment bath
51 & 52 walls of treatment bath
53 & 54 ear parts
55 circuit board
56 external terminal
57 sockets 58 constant current diode
59 rectifier diode

The invention claimed is:

1. An apparatus for producing solid electrolytic capacitors, comprising:
   at least one jig comprising:
      a plurality of conductors for producing solid electrolytic capacitors; and
      a plurality of sockets which fixes an end of a lead wire extending out of individual ones of the plurality of conductors;
   a plurality of treatment baths for forming a dielectric layer and a semiconductor layer on the plurality of conductors; and
   a robotic device having a movable arm and a basket attached to the movable arm for housing the plurality of conductors, wherein the robotic device inserts and fixes a plurality of the lead wires into the plurality of sockets;
   wherein the at least one jig is transferred to above treatment baths to immerse the plurality of conductors in a treatment solution in each of the baths sequentially; and
   wherein electric currents are passed to the plurality of conductors therein to thereby form the dielectric layer and the semiconductor layer sequentially on the plurality to conductors.

2. The apparatus for producing solid electrolytic capacitors according to claim 1, further comprising a let-off device which accommodates a plurality of the at least one jig and intermittently lets off each of the plurality of at least one jig individually at the next operation stage.

3. The apparatus for producing solid electrolytic capacitors according to claim 1, further comprising a lining-up device which aligns the plurality of conductors for producing solid electrolytic capacitors to face the same direction.

4. The apparatus for producing solid electrolytic capacitors according to claim 3, wherein the robotics device fixes the plurality of conductors for producing solid electrolytic capacitors, having been aligned by the lining-up device, by inserting the lead wire of each of the plurality of conductors into the plurality of sockets provided on the at least one jig for producing capacitors on the operation stage.

5. The apparatus for producing solid electrolytic capacitors according to claim 1, comprising a transfer device which transfers the at least one jig for producing capacitors to above the treatment baths on completion of the insertion and fixation of the plurality of lead wires of the plurality of conductors into the plurality of sockets of the jig.

6. The apparatus for producing solid electrolytic capacitors according to claim 1, comprising racks having a plurality of slots for vertically holding a plurality of the at least one jig for producing capacitors and further comprising an inserting device which inserts each of the plurality of at least one jig for producing capacitors into slots of the rack on completion of fixation of the plurality of conductors to the at least one jig.

7. The apparatus for producing solid electrolytic capacitors according to claim 5, wherein the plurality of treatment baths comprises a treating bath for forming a dielectric layer, wherein the transfer device transfers the at least one jig for producing capacitors to above each of the plurality of treatment baths sequentially and brings down the at least one jig toward the treating bath for forming the dielectric layer to thereby immerse the plurality of conductors hanging down from the at least one jig in the treating bath for a predetermined period of time, and electric current is passed thereto through the plurality of sockets to thereby form a dielectric layer.

8. The apparatus for producing solid electrolytic capacitors according to claim 5, wherein the plurality of treatment baths comprises a treating bath for forming a semiconductor layer, wherein the transfer device transfers the at least one jig for producing capacitors to above each of the treatment baths sequentially and brings down the at least one jig toward the treating bath for forming a semiconductor layer to thereby immerse the plurality of conductors hanging down from the at least one jig in the treating bath for a predetermined period of time, and electric current is passed thereto through the plurality of sockets to thereby form a semiconductor layer.

9. The apparatus for producing solid electrolytic capacitors according to claim 1, further comprising a remover device which dismounts the capacitors together with the lead wires from the plurality of sockets of the at least one jig after forming an electroconductive layer on the conductor surface.

10. The apparatus for producing solid electrolytic capacitors according to claim 1, wherein the at least one jig for producing capacitors comprises a circuit for applying current equally to each of the plurality of conductors.

11. The apparatus for producing solid electrolytic capacitors according to claim 10, wherein the circuit has a diode whose cathode side is connected to each connecting terminal of the plurality of sockets and a discharge-type constant current source whose output side is connected to each terminal.

12. The apparatus for producing solid electrolytic capacitors according to claim 1, wherein each of the lead wires of each of the plurality of conductors has a washer made of insulative polymer at its base part.

13. A method for producing solid electrolytic capacitors, using the production apparatus described in claim 1.

14. A solid electrolytic capacitor produced by the method for producing solid electrolytic capacitors described in claim 13.

15. The apparatus for producing solid electrolytic capacitors according to claim 6, wherein the plurality of treatment baths comprises a treating bath for forming a dielectric layer, wherein the transfer device transfers the racks for holding a plurality of the at least one jig to above each of the treatment baths sequentially and brings down the racks toward the treating bath for forming a dielectric layer to thereby immerse the plurality of conductors hanging down from the at least one jig in the treating bath for a predetermined period of time, and electric current is passed thereto through the plurality of sockets to thereby form a dielectric layer.

16. The apparatus for producing solid electrolytic capacitors according to claim 6, wherein the plurality of treatment baths include a treating bath for forming a semiconductor layer, wherein the transfer device transfers the racks for holding a plurality of the at least one jig to above each of the treatment baths sequentially and brings down the racks toward the treating bath for forming the semiconductor layer to thereby immerse the plurality of conductors hanging down from the at least one jig in the treating bath for a predetermined period of time, and electric current is passed thereto through the plurality of sockets to thereby form a semiconductor layer.

* * * * *